United States Patent
Miyamoto et al.

(10) Patent No.: US 12,263,979 B2
(45) Date of Patent: Apr. 1, 2025

(54) ARTICLE PROCESSING APPARATUS AND DOWNSTREAM APPARATUS

(71) Applicant: Ishida Co., Ltd., Kyoto (JP)

(72) Inventors: Hideshi Miyamoto, Ritto (JP); Makoto Ichikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 395 days.

(21) Appl. No.: 17/454,972

(22) Filed: Nov. 15, 2021

(65) Prior Publication Data

US 2022/0169410 A1 Jun. 2, 2022

(30) Foreign Application Priority Data

Nov. 27, 2020 (JP) ................................. 2020-197081

(51) Int. Cl.
| | | |
|---|---|---|
| *B65B 57/14* | (2006.01) | |
| *B65B 1/32* | (2006.01) | |
| *B65D 88/28* | (2006.01) | |

(52) U.S. Cl.
CPC ............... *B65B 57/14* (2013.01); *B65B 1/32* (2013.01); *B65D 88/28* (2013.01)

(58) Field of Classification Search
CPC .......... B65B 57/14; B65B 1/32; B65B 57/18; B65B 65/00; B65D 88/28; G01G 19/393; G05B 19/41815; G05B 2219/37565; G05B 2219/45048; G05B 2219/49113; G05B 2219/50019; G05B 2219/50036; G05B 19/402; Y02P 90/02
See application file for complete search history.

(56) References Cited

U.S. PATENT DOCUMENTS

| | | | | |
|---|---|---|---|---|
| 8,903,145 | B2* | 12/2014 | Kersting | ................... G06T 7/30 |
| | | | | 606/4 |
| 10,151,622 | B2* | 12/2018 | Hirose | ................. G01G 19/387 |
| 11,640,010 | B2* | 5/2023 | Cruse | ........................ B65B 1/32 |
| | | | | 356/237.1 |
| 11,828,643 | B2* | 11/2023 | Hien | .................... G01G 19/393 |

(Continued)

FOREIGN PATENT DOCUMENTS

| | | |
|---|---|---|
| CN | 103072207 A | 5/2013 |
| CN | 206330663 U | 7/2017 |

(Continued)

OTHER PUBLICATIONS

The extended European search report issued by the European Patent Office on Apr. 25, 2022, which corresponds to European Patent Application No. 21207020.5-1205 and is related to U.S. Appl. No. 17/454,972.

(Continued)

*Primary Examiner* — Michael S Osinski
(74) *Attorney, Agent, or Firm* — Studebaker Brackett PLLC

(57) ABSTRACT

An article processing apparatus (1) according to an embodiment discharges an article to a downstream apparatus (2) disposed downstream. The article processing apparatus includes: a display (110); a capturing unit (100) that captures a picture including at least part of the downstream apparatus; and a controller (30) that displays, in a case where a processing operation of the article remains stopped in the article processing apparatus, on the display, the picture captured by the capturing unit.

12 Claims, 5 Drawing Sheets

(56) References Cited

U.S. PATENT DOCUMENTS

| | | | |
|---|---|---|---|
| 2002/0161467 A1 | 10/2002 | Hashiguchi et al. | |
| 2004/0187468 A1* | 9/2004 | Krone | A01F 15/0858 56/341 |
| 2006/0159307 A1* | 7/2006 | Anderson | B07C 3/20 382/101 |
| 2008/0180526 A1* | 7/2008 | Trevino | B60D 1/36 348/E7.086 |
| 2011/0075886 A1* | 3/2011 | Ashjaee | G06T 7/70 342/450 |
| 2013/0278752 A1* | 10/2013 | Schorr | G01C 11/00 348/95 |
| 2014/0105457 A1* | 4/2014 | Metzler | G01C 15/002 382/103 |
| 2014/0238754 A1* | 8/2014 | Liao | G01G 19/42 177/1 |
| 2015/0021103 A1* | 1/2015 | Tamai | G01G 19/387 177/25.18 |
| 2015/0226600 A1* | 8/2015 | Kikuchi | G01G 19/393 177/25.18 |
| 2016/0114925 A1* | 4/2016 | Yuyama | G16H 30/20 382/141 |
| 2016/0169625 A1* | 6/2016 | Richards | F41G 11/003 348/333.02 |
| 2016/0334265 A1 | 11/2016 | Kageyama et al. | |
| 2016/0381297 A1* | 12/2016 | Alsheuski | H04N 23/635 348/36 |
| 2017/0237943 A1* | 8/2017 | Conti | H04N 7/181 348/159 |
| 2020/0341166 A1* | 10/2020 | Cruse | G01V 8/10 |
| 2021/0404860 A1* | 12/2021 | Hien | G01G 19/393 |
| 2022/0146301 A1* | 5/2022 | Kishikawa | G01G 19/387 |

FOREIGN PATENT DOCUMENTS

| | | |
|---|---|---|
| CN | 207209441 U | 4/2018 |
| EP | 3 098 580 A1 | 11/2016 |
| EP | 3 882 184 A1 | 9/2021 |
| JP | 2002-059907 A | 2/2002 |
| JP | 2009-258040 A | 11/2009 |

OTHER PUBLICATIONS

An Office Action mailed by China National Intellectual Property Administration on Dec. 1, 2023, which corresponds to Chinese Patent Application No. 202111385012.7 and is related to U.S. Appl. No. 17/454,972; with English language translation.

* cited by examiner

ARTICLE PROCESSING APPARATUS AND DOWNSTREAM APPARATUS

CROSS-REFERENCE TO RELATED APPLICATION

This application is based upon and claims the benefit of priority from Japanese Patent Application No. 2020-197081 filed on Nov. 27, 2020 in Japan, the entire contents of which are incorporated herein by reference.

TECHNICAL FIELD

The present invention relates to an article processing apparatus and a downstream apparatus.

BACKGROUND ART

In a case where an article processing apparatus, such a combination weighing apparatus, and a downstream apparatus, such as a packaging machine, are used in combination, in general, the center of the article processing apparatus and the center of the downstream apparatus require aligning (for example, refer to JP 2009-258040 A).

In particular, such center alignment is important for high-rate weighing and packaging.

For example, known has been the center alignment based on visual observation of a combination weighing apparatus and a packaging machine from all sides.

In addition, known has been the center alignment based on a process including hanging a chain from the center of a combination weighing apparatus, attaching a jig to a stand supporting a former in a packaging machine, making a hole at the position of the jig corresponding to the center of the former, and adjusting the position of the packaging machine such that the chain hanging from the center of the combination weighing apparatus passes through the hole of the jig.

SUMMARY OF THE INVENTION

Technical Problem

However, such conventional center alignment has a problem regarding accuracy or a problem in that its preparation is intricate.

Thus, the present invention has been made in consideration of the problem, and an object of the present invention is to provide an article processing apparatus and a downstream apparatus that enable easy and accurate alignment of the center of the article processing apparatus and the center of the downstream apparatus.

Solution to Problem

An article processing apparatus according to an embodiment is summarized as an article processing apparatus that discharges an article to a downstream apparatus disposed downstream, the article processing apparatus including: a display; a capturing unit that captures a picture including at least part of the downstream apparatus; and a controller that displays, in a case where a processing operation of the article remains stopped in the article processing apparatus, on the display, the picture captured by the capturing unit.

A downstream apparatus according to an embodiment is summarized as a downstream apparatus that receives an article discharged from an article processing apparatus disposed upstream, the downstream apparatus processing the article, the downstream apparatus including: a display; a capturing unit that captures a picture including at least part of the article processing apparatus; and a controller that displays, in a case where a processing operation of the article remains stopped in the downstream apparatus, on the display, the picture captured by the capturing unit.

Advantageous Effects of Invention

According to the present invention, it is possible to provide an article processing apparatus and a downstream apparatus that enable easy and accurate alignment of the center of the article processing apparatus and the center of the downstream apparatus.

DESCRIPTION OF EMBODIMENTS

Figure 1:
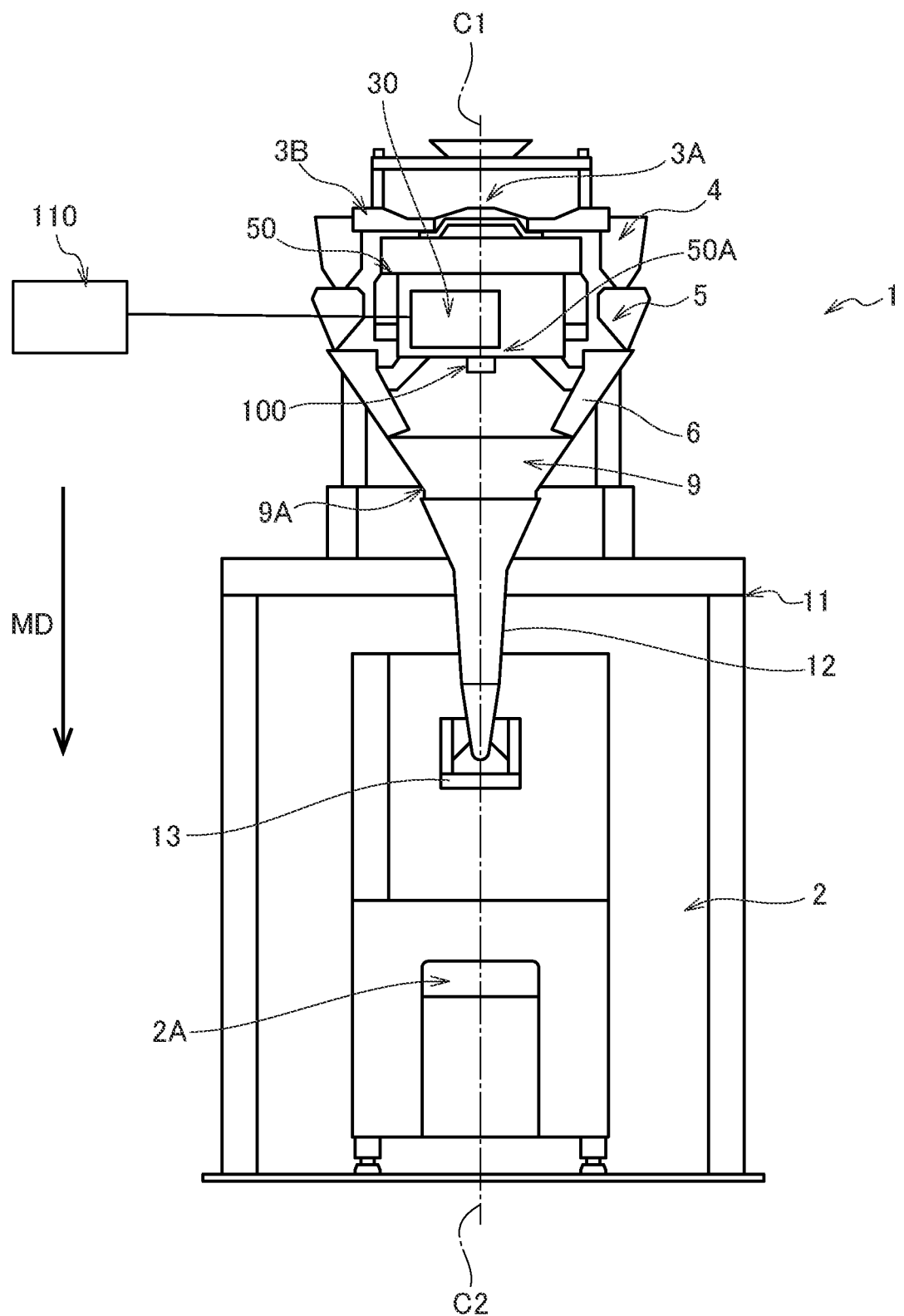
FIG. 1 is an explanatory view of an exemplary combination of an article processing apparatus (combination weighing apparatus) and a downstream apparatus (packaging machine) according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

An article processing apparatus (combination weighing apparatus) 1 and a downstream apparatus (packaging machine) 2 according to a first embodiment of the present invention will be described below with reference to FIGS. 1 and 2. In the present specification, given will be some cases where a combination weighing apparatus 1 is used as an article processing apparatus and a packaging machine 2 is used as a downstream apparatus. However, the present invention is not limited to the cases, and thus can be applied to a case where other apparatuses are used as an article processing apparatus and a downstream apparatus. For example, given may be a case where a combination weighing apparatus is disposed as an article processing apparatus and a conveyance apparatus that conveys containers in sequence is used as a downstream apparatus.

The combination weighing apparatus 1 according to the present embodiment discharges articles to the downstream apparatus 2 disposed downstream. The packaging machine 2 according to the present embodiment receives the articles discharged from the combination weighing apparatus 1 disposed upstream and then processes (packages) the articles.

As illustrated in FIG. 1, the combination weighing apparatus 1 according to the present embodiment includes a distribution feeder 3A, radial feeders 3B, pool hoppers 4, weighing hoppers 5, discharge chutes 6, a gathering chute 9, a mount 11, a controller 30, a main body 50, a capturing unit 100, and a display 110.

The distribution feeder 3A is a smoothly conic member. A supply conveyer (not illustrated) provided outside, namely, above the distribution feeder 3A supplies articles to the distribution feeder 3A. The distribution feeder 3A has an upper face that vibrates due to an electromagnet, not illustrated, provided at the lower portion of the distribution feeder 3A. The distribution feeder 3A conveys the articles supplied on the upper face, radially in a circumferentially distributing manner, to supply each article to any of the radial feeders 3B.

The radial feeders 3B are each a sheet-metal member made of a bent stainless-steel plate. The radial feeders 3B are disposed radially along the circumference of the distribution feeder 3A.

The radial feeders 3B each have a conveyance face that vibrates due to an electromagnet (not illustrated) provided at the lower portion of the radial feeder 3B. The radial feeders 3B each convey the articles outward, due to vibration of the conveyance face.

The pool hoppers 4 each temporarily accumulate the articles supplied from the corresponding radial feeder 3B, and then send the articles to the weighing hopper 5 disposed below the pool hopper 4.

The weighing hoppers 5 each acquire the weight value of the temporarily accumulated articles sent from the corresponding pool hopper 4. Each acquired weight value is sent to the controller 30. The weighing hoppers 5 each discharge the articles to the discharge chute 6 disposed below the weighing hopper 5.

The discharge chutes 6 each discharge, by sliding, the articles discharged from the corresponding weighing hopper 5, to the gathering chute 9.

The gathering chute 9 slides down the articles discharged from each discharge chute 6, to the packaging machine 2.

The main body 50 has an outer circumference along which drive units (not illustrated) that drive the respective corresponding hoppers (pool hoppers 4 and weighing hoppers 5) are attached. Each hopper is attached to the leading end of a hopper hanger (not illustrated) provided at the drive unit that drives the hopper.

As illustrated in FIG. 1, the combination weighing apparatus 1 is mounted on the mount 11. Note that, as illustrated in FIG. 1, the packaging machine 2 is disposed in the housing space of the mount 11. In other words, the packaging machine 2 is disposed in the internal space surrounded by the mount 11.

The capturing unit 100 captures a picture including at least part of the packaging machine 2. In the present embodiment, as illustrated in FIG. 1, the capturing unit 100 is installed on the downstream side of the bottom 50A of the main body 50. For example, the capturing unit 100 is achieved by a camera.

As illustrated in FIG. 1, the capturing unit 100 captures a picture from the upstream side to the downstream side in the conveyance direction MD of articles. For example, as illustrated in FIG. 2, the capturing unit 100 captures a picture from which a former 13 in the packaging machine 2 can be viewed through the outlet 9A of the gathering chute 9 or a downstream chute 12.

The capturing unit 100 facing the downstream side from the bottom 50A captures an image every predetermined capturing cycle. In this case, the capturing unit 100 may record, as a still image or as a moving image, the image acquired every capturing cycle.

Note that the capturing unit 100 captures the picture described above in a first mode in which the processing operation of articles remains stopped in the combination weighing apparatus 1. The capturing unit 100 may capture the picture described above in a second mode in which the processing operation of articles is being performed in the combination weighing apparatus 1.

In the second mode, the capturing unit 100 captures a picture from which the discharge state of articles discharged to the packaging machine 2 can be grasped through the outlet 9A of the gathering chute 9 or the downstream chute 12.

The display 110 displays the picture captured by the capturing unit 100, in accordance with an instruction from the controller 30.

In the present embodiment, as illustrated in FIG. 1, the display 110 is provided outside the combination weighing apparatus 1, but may be provided at part of the combination weighing apparatus 1. Alternatively, the display 110 may be achieved by a display in an operation unit that operates the combination weighing apparatus 1.

In the first mode, the controller 30 displays, on the display 110, the picture captured by the capturing unit 100.

The controller 30 displays, on the display 110, the picture captured by the capturing unit 100 as a picture for adjustment of the positional relationship between the combination weighing apparatus 1 and the packaging machine 2.

Figure 2:
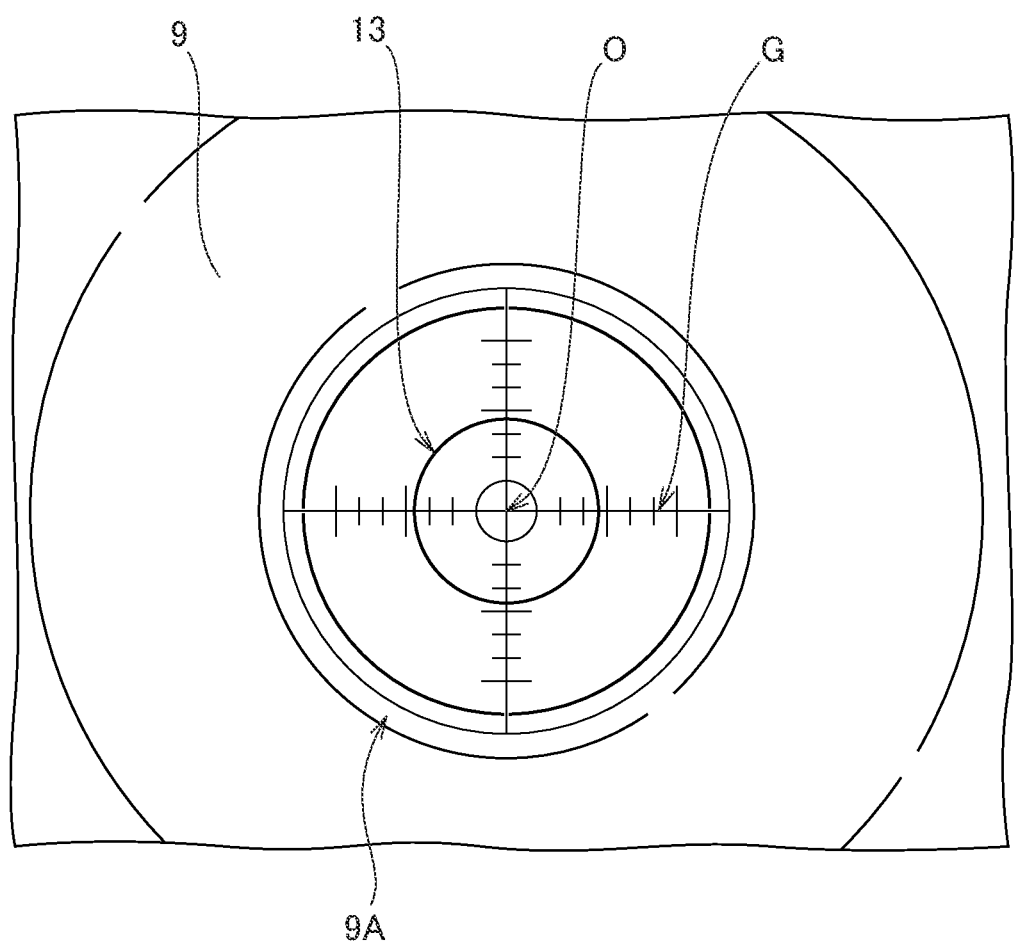
FIG. 2 is a view from upstream in FIG. 1.

Specifically, as illustrated in FIG. 2, the controller 30 displays, on the display 110, the picture captured by the capturing unit 100. While verifying the picture displayed on the display 110, an operator aligns the center C1 of the combination weighing apparatus 1 and the center C2 of the former 13 in the packaging machine 2.

In this case, as illustrated in FIG. 2, the controller 30 displays, on the display 110, a guide G that facilitates adjustment of the positional relationship between the center C1 and the center C2 described above, together with the picture captured by the capturing unit 100.

As illustrated in FIG. 2, the guide G may include graduations each indicating the distance from its center 0. In this case, the center 0 is identical to the center C1 described above.

In a case where the capturing unit 100 captures a picture with the gathering chute 9 removed, the outlet 9A of the gathering chute 9 is not displayed on the display 110. Thus, the controller 30 may display, on the display 110, a circle virtually indicating the outlet 9A of the gathering chute 9 or the outlet of the downstream chute 12, as a guide for attachment of the capturing unit 100.

The operator can change the display style in pitch or the like of graduations by operating the display 110 (or operation unit). Specifically, the controller 30 changes the graduations displayed on the display 110 such that the pitch is set densely or coarsely.

In the first mode, the controller 30 may further make a display such that part of the image captured by the capturing unit 100 is enlarged. In this case, the controller 30 can make a display such that the picture corresponding to the portion surrounded by the outlet 9A of the gathering chute 9 or the outlet of the downstream chute 12 is enlarged. This arrangement enables the operator to display a large picture for use in alignment, so that the work efficiency of the operator can be improved.

Meanwhile, in the second mode, for verification of the sliding state of articles in the gathering chute 9, the controller 30 may display the picture acquired by the capturing unit 100, directly, without such enlargement as above.

The operator aligns the center C1 of the combination weighing apparatus 1 (outlet 9A of the gathering chute 9 or outlet of the downstream chute 12) and the center C2 of the packaging machine 2 (former 13) with the center 0 of the guide G, so that the center C1 of the combination weighing apparatus 1 and the center C2 of the packaging machine 2 are in alignment.

The controller 30 may change the display aspect in outline of the outlet 9A of the gathering chute 9, as the guide G. For example, the controller 30 may display the outlet 9A of the gathering chute 9 or may delete the display of the outlet 9A of the gathering chute 9.

The center position of a picture acquired by capturing with the capturing unit 100 depends on the accuracy of attachment of the capturing unit 100 to the main body 50. That is, in a case where the guide G is set uniformly to combination weighing apparatuses 1, the combination weighing apparatuses 1 are likely to differ in center C1 due to the individual differences of apparatuses. Furthermore, the position at which the capturing unit 100 is attached is likely to vary, for example, due to cleaning.

Thus, the controller 30 has a function of calibrating display of the guide G to the display 110. Specifically, the controller 30 has a function of adjusting the position of display of the guide G to the image acquired by capturing with the capturing unit 100. In other words, the controller 30 has a function of changing the position of the guide G to be superimposed onto the picture that the display 110 displays.

In the second mode, the controller 30 displays, on the display 110, the picture captured by the capturing unit 100 as a picture for verification of the discharge state of articles discharged to the packaging machine 2.

As illustrated in FIGS. 1 and 2, the picture displayed by the display 110 may include a picture of the outlet 9A of the gathering chute 9 and a picture of the former 13 in the packaging machine 2, viewed from the upstream side to the downstream side in the conveyance direction MD of articles.

Note that the controller 30 selects, from all combinations of the respective weight values acquired by the weighing hoppers 5, a combination within a predetermined allowable range and closest to the target value, and discharges the temporarily accumulated articles from the weighing hoppers 5 corresponding to the combination to the discharge chutes 6 disposed below the weighing hoppers 5.

As illustrated in FIG. 1, the packaging machine 2 according to the present embodiment includes the downstream chute 12, the former 13, and a conveyance unit 2A.

The former 13 forms, into a tubular film, a sheet film sent from a film supply mechanism (not illustrated) in the packaging machine 2.

Specifically, as illustrated in FIG. 1, the downstream chute 12 is provided downstream of the gathering chute 9, and the articles discharged from the gathering chute 9 are sent downstream through the inside of the downstream chute 12. Then, the articles are enclosed in the tubular film formed by the former 13.

Note that the downstream chute 12 may detect metallic foreign matter in the articles discharged from the gathering chute 9.

The conveyance unit 2A conveys the articles in a single package to a foreign-matter detection apparatus disposed downstream of the packaging machine 2.

According to the present embodiment, in a case where the processing operation of articles remains stopped, the operator can verify, through the display (operation unit), a picture including at least part of the packaging machine 2, so that the combination weighing apparatus 1 and the packaging machine 2 can be installed properly.

According to the present embodiment, on the basis of verification of the picture described above, the operator can easily adjust the positional relationship between the combination weighing apparatus 1 and the packaging machine 2. That is, the center C1 of the combination weighing apparatus 1 and the center C2 of the packaging machine 2 can be easily aligned, so that an improvement can be made in work efficiency.

According to the present embodiment, in a case where the processing operation of articles is being performed, on the basis of verification of the picture described above, the operator can verify the discharge state of articles from the combination weighing apparatus 1.

According to the present embodiment, the operator can verify the position of the packaging machine 2 through the outlet 9A of the gathering chute 9 included in the picture described above.

Furthermore, according to the present embodiment, on the basis of the guide G described above, the operator can align the center C1 of the combination weighing apparatus 1 and the center C2 of the packaging machine 2, more easily.

According to the present embodiment, the capturing unit 100 is installed on the downstream side of the bottom 50A of the main body 50, so that the picture described above can be captured without attachment and detachment of a jig or the like.

Note that, according to the present embodiment, any type of packaging machine or conveyance apparatus in conjunction with cups, trays, or buckets can be aligned with the combination weighing apparatus 1. According to the present embodiment, even in a case where the combination weighing apparatus 1 and the packaging machine 2 differ in maker, the center C1 of the combination weighing apparatus 1 and the center C2 of the packaging machine 2 can be aligned.

Modification 1

Figure 3:
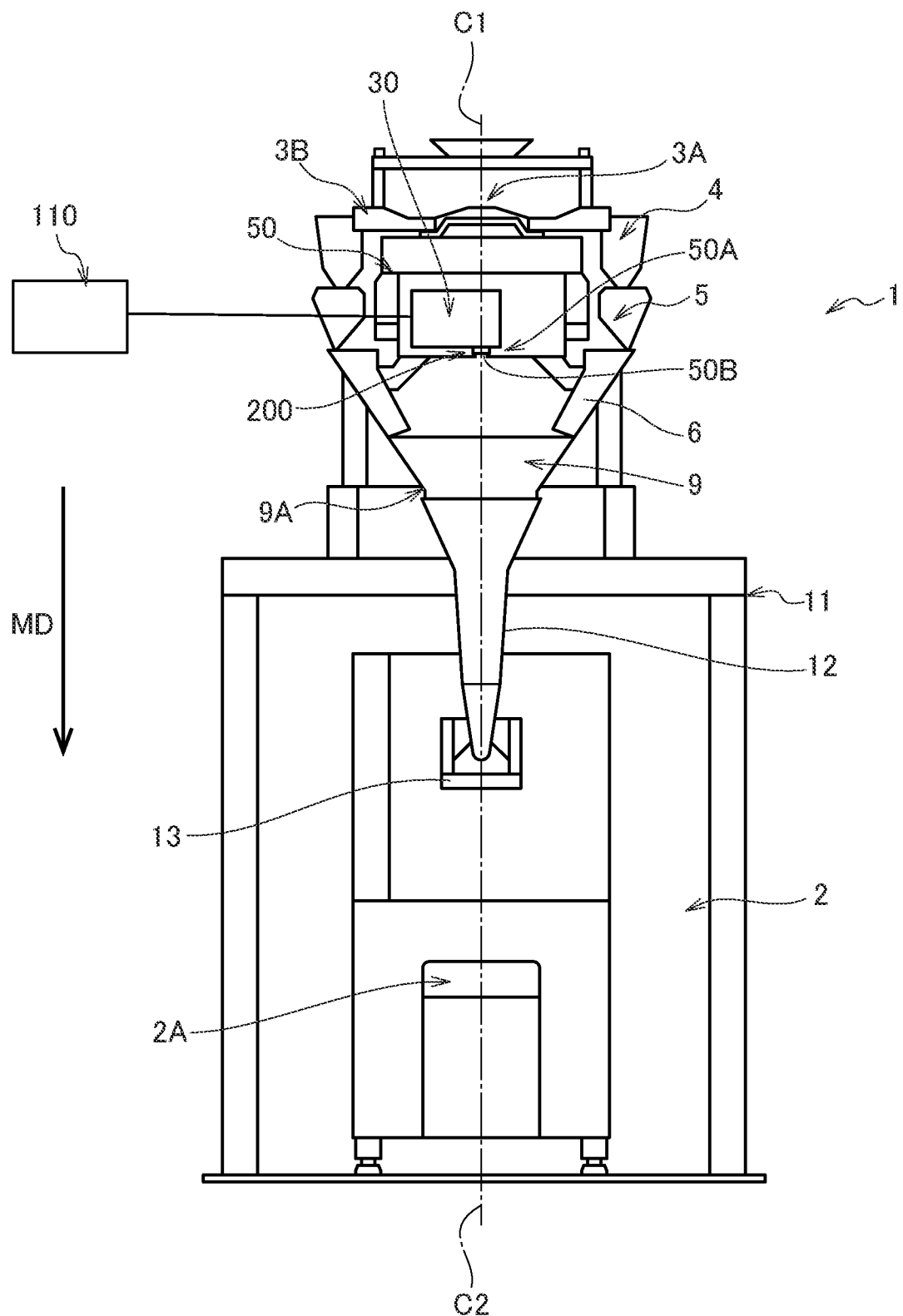
FIG. 3 is an explanatory view of an exemplary combination of an article processing apparatus (combination weighing apparatus) and a downstream apparatus (packaging machine) according to Modification 1.

With reference to FIG. 3, a combination weighing apparatus 1 and a packaging machine 2 according to Modification 1 will be described below with a focus on the difference from the combination weighing apparatus 1 and the packaging machine 2 according to the embodiment described above.

In Modification 1, as illustrated in FIG. 3, a capturing unit 200 is built in a main body 50. In Modification 1, the capturing unit 200 captures a picture from the upstream side to the downstream side in the conveyance direction MD of articles, through a hole 50B provided at the bottom 50A of the main body 50.

According to Modification 1, because the capturing unit 200 is built in the main body 50, the capturing unit 200 can capture the picture described above without any influence due to the operation of the combination weighing apparatus 1.

Modification 2

Figure 4:
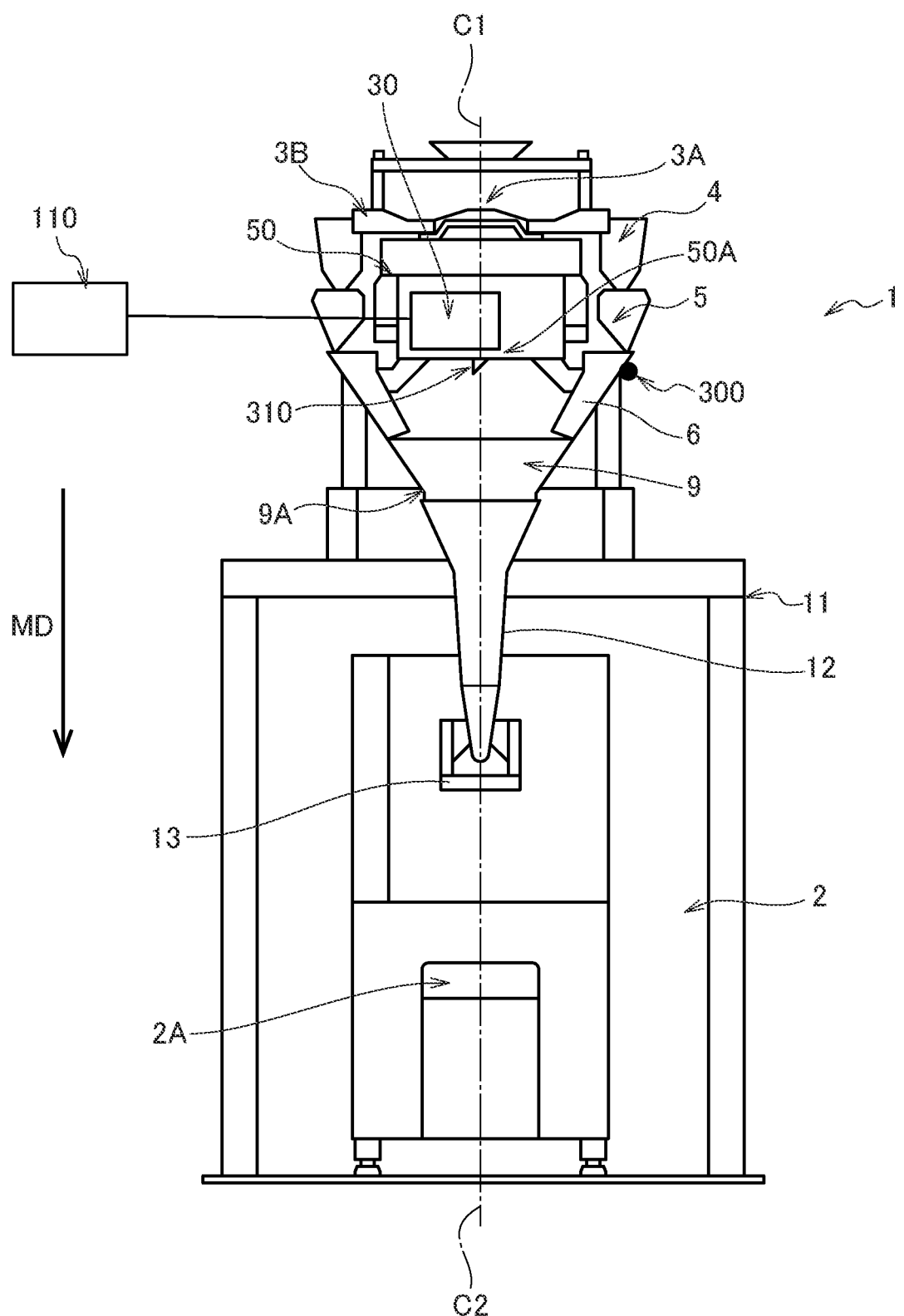
FIG. 4 is an explanatory view of an exemplary combination of an article processing apparatus (combination weighing apparatus) and a downstream apparatus (packaging machine) according to Modification 2.

With reference to FIG. 4, a combination weighing apparatus 1 and a packaging machine 2 according to Modification 2 will be described below with a focus on the difference from the combination weighing apparatus 1 and the packaging machine 2 according to the embodiment described above.

In Modification 2, as illustrated in FIG. 4, a capturing unit 300 is provided outside the side of a main body 50. In Modification 2, the capturing unit 300 captures the picture described above, with a reflective plate 310 provided on the downstream side of the bottom 50A of the main body 50 and near the center C1.

According to Modification 2, because the capturing unit 300 is provided outside the side of the main body 50, the capturing unit 300 can capture the picture described above without any influence due to the operation of the combination weighing apparatus 1.

Modification 3

Figure 5:
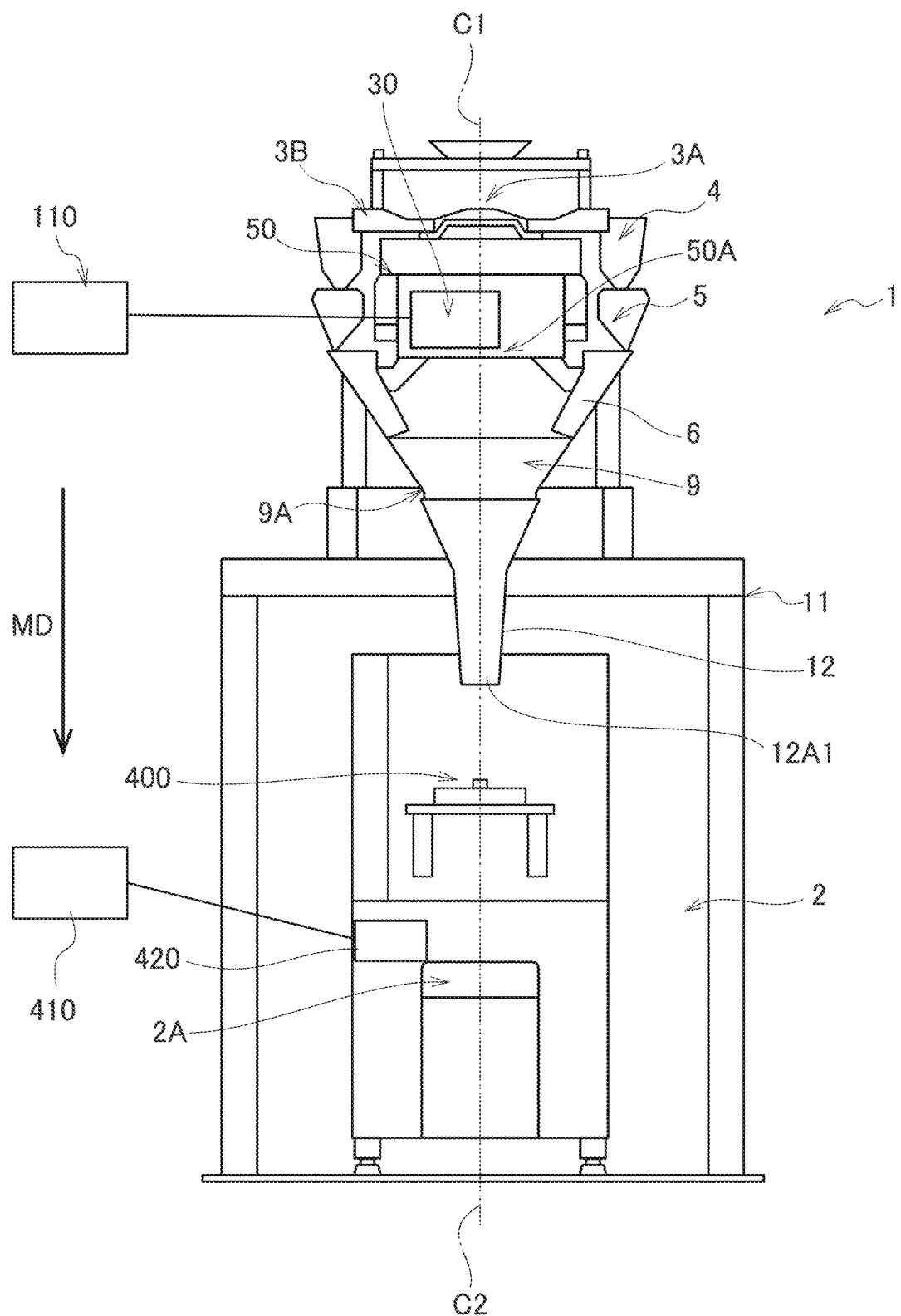
FIG. 5 is an explanatory view of an exemplary combination of an article processing apparatus (combination weighing apparatus) and a downstream apparatus (packaging machine) according to Modification 3.

With reference to FIG. 5, a combination weighing apparatus 1 and a packaging machine 2 according to Modification 3 will be described below with a focus on the difference from the combination weighing apparatus 1 and the packaging machine 2 according to the embodiment described above.

In Modification 3, as illustrated in FIG. 5, the packaging machine 2 includes a capturing unit 400, a display 410, and a controller 420.

The capturing unit 400 captures a picture including at least part of the combination weighing apparatus 1. In Modification 3, as illustrated in FIG. 5, the capturing unit 400 is provided near the center C2 of the packaging machine 2. For example, the capturing unit 400 is achieved by a camera.

As illustrated in FIG. 5, the capturing unit 400 captures a picture from the downstream side to the upstream side in the conveyance direction MD of articles. For example, the capturing unit 400 may capture a picture including an outlet 12A1 provided at the downstream end of a downstream chute 12.

The display 410 displays the picture captured by the capturing unit 400, in accordance with an instruction from the controller 420.

In Modification 3, as illustrated in FIG. 5, the display 410 is provided outside the packaging machine 2, but may be provided at part of the packaging machine 2. The display 410 may be achieved by a display in an operation unit that operates the packaging machine 2.

In a case where the processing operation of articles remains stopped in the packaging machine 2, the controller 420 may display, on the display 410, the picture captured by the capturing unit 400.

The controller 420 may display, on the display 410, the picture captured by the capturing unit 400 as a picture for adjustment of the positional relationship between the combination weighing apparatus 1 and the packaging machine 2.

Specifically, as illustrated in FIG. 5, the controller 420 may display, on the display 410, the picture captured by the capturing unit 400 as a picture for alignment of the center C1 of the combination weighing apparatus 1 and the center C2 of the packaging machine 2.

In a case where the processing operation of articles is being performed in the packaging machine 2, the controller 420 may display, on the display 410, the picture captured by the capturing unit 400 as a picture for verification of the discharge state of articles discharged from the combination weighing apparatus 1.

The picture displayed by the display 410 may include a picture of the outlet 9A of a gathering chute 9 and a picture of a former 13 in the packaging machine 2, viewed from the downstream side to the upstream side in the conveyance direction MD of articles.

Furthermore, the controller 420 may display a guide G on the display 410, similarly to a controller 30.

According to Modification 3, in a case where the processing operation of articles remains stopped, an operator can verify, through the display (operation unit), a picture including at least part of the combination weighing apparatus 1, so that the combination weighing apparatus 1 and the packaging machine 2 can be installed properly.

According to Modification 3, in a case where the processing operation of articles is being performed, on the basis of verification of the picture described above, the operator can verify the discharge state of articles from the combination weighing apparatus 1.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. An article processing apparatus that discharges an article to a downstream apparatus disposed downstream, the article processing apparatus comprising:
    a display;
    a capturing unit that is disposed in a position having an internal view of and through an outlet of a discharge chute directly from an upstream side to a downstream side in a conveyance direction of the article, and that captures a picture including at least part of the downstream apparatus; and
    a controller that displays, in a case where a processing operation of the article remains stopped in the article processing apparatus, on the display, the picture captured by the capturing unit,
    wherein the controller displays, on the display, the picture captured by the capturing unit as a picture for adjustment of a positional relationship between the article processing apparatus and the downstream apparatus.

2. The article processing apparatus according to claim 1, wherein the controller displays, in a case where the processing operation of the article is being performed in the article processing apparatus, on the display, the picture captured by the capturing unit as a picture for verification of a discharge state of the article discharged to the downstream apparatus.

3. The article processing apparatus according to claim 1, further comprising:
    a hopper that temporarily accumulates the article input from outside; and the discharge chute that slides down the article discharged from the hopper, to the downstream apparatus, wherein the picture includes a picture of the outlet of the discharge chute viewed from the upstream side to the downstream side in the conveyance direction of the article.

4. The article processing apparatus according to claim 3, wherein the controller displays, on the display, a guide for use in adjustment of a positional relationship between the outlet and a conveyance unit in the downstream apparatus, together with the picture.

5. The article processing apparatus according to claim 4, wherein the controller changes a display aspect in outline of the outlet, as the guide.

6. The article processing apparatus according to claim 3, further comprising a main body having an outer circumference along which a drive unit that drives the hopper is attached,
wherein the capturing unit is installed on the downstream side of a bottom of the main body.

7. The article processing apparatus according to claim 3, further comprising a main body having an outer circumference along which a drive unit that drives the hopper is attached,
wherein the capturing unit is built in the main body.

8. The article processing apparatus according to claim 4, wherein the guide includes graduations each indicating a distance from a center of the guide.

9. The article processing apparatus according to claim 8, wherein the controller is configured to change a display style in pitch of the graduations.

10. The article processing apparatus according to claim 4, wherein the controller is configured to adjust a position of the guide to the picture captured by the capturing unit.

11. A downstream apparatus that receives an article discharged from an article processing apparatus disposed upstream, the downstream apparatus processing the article, the downstream apparatus comprising:
a display;
a capturing unit that is disposed in a position having an internal view of and through an outlet of a discharge chute directly from an upstream side to a downstream side in a conveyance direction of the article, and that captures a picture including at least part of the article processing apparatus; and
a controller that displays, in a case where a processing operation of the article remains stopped in the downstream apparatus, on the display, the picture captured by the capturing unit,
wherein the controller displays, on the display, the picture captured by the capturing unit as a picture for adjustment of a positional relationship between the article processing apparatus and the downstream apparatus.

12. An article processing apparatus that discharges an article to a downstream apparatus disposed downstream, the article processing apparatus comprising:
a display;
a capturing unit that captures a picture including at least part of the downstream apparatus;
a controller that displays, in a case where a processing operation of the article remains stopped in the article processing apparatus, on the display, the picture captured by the capturing unit;
a hopper that temporarily accumulates the article input from outside; and
a discharge chute that slides down the article discharged from the hopper, to the downstream apparatus,
wherein the picture includes a picture of an outlet of the discharge chute viewed from an upstream side to a downstream side in a conveyance direction of the article, and
the controller displays, on the display, a guide for use in adjustment of a positional relationship between the outlet and a conveyance unit in the downstream apparatus, together with the picture.

* * * * *